W. Spencer,
Dyeing Vats,
No. 41.
A. I. Apr. 17. 1841
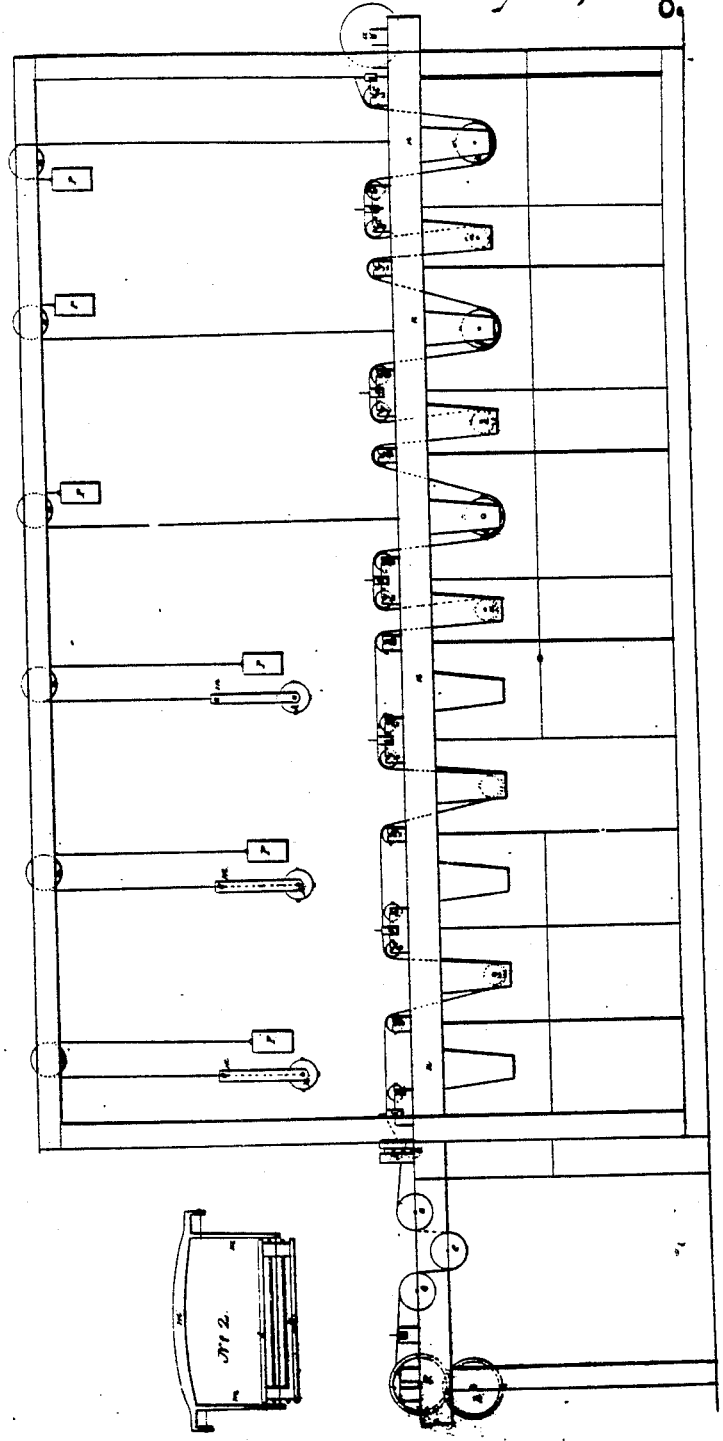
BEST AVAILABLE COPY